(12) United States Patent
Bastien

(10) Patent No.: US 11,318,978 B2
(45) Date of Patent: May 3, 2022

(54) PUSH ON AXLE FOR STROLLER

(71) Applicant: MONAHAN PRODUCTS, LLC, Rockland, MA (US)

(72) Inventor: Richard M. Bastien, Cumberland, RI (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 0 days.

(21) Appl. No.: 16/994,510

(22) Filed: Aug. 14, 2020

(65) Prior Publication Data
US 2022/0048551 A1 Feb. 17, 2022

(51) Int. Cl.
*B62B 9/12* (2006.01)
*B62B 7/04* (2006.01)

(52) U.S. Cl.
CPC . *B62B 9/12* (2013.01); *B62B 7/04* (2013.01)

(58) Field of Classification Search
CPC .. B62B 9/12; B62B 7/04; B62B 7/046; B60B 37/06; B60B 37/08; B60B 37/10
See application file for complete search history.

(56) References Cited

U.S. PATENT DOCUMENTS

| | | | | |
|---|---|---|---|---|
| 5,482,305 | A * | 1/1996 | Jeffries | A61G 5/023 280/250.1 |
| 5,562,300 | A * | 10/1996 | Nelson | B62B 7/04 280/47.38 |
| 5,727,850 | A * | 3/1998 | Masclet | A61G 5/10 301/111.03 |
| 9,067,613 | B2 * | 6/2015 | Yi | B62B 9/082 |
| 9,644,730 | B2 * | 5/2017 | Judge | A61G 5/023 |
| 10,259,483 | B2 * | 4/2019 | Plested | B62B 9/082 |
| 2006/0103085 | A1 | 5/2006 | Sanchez | |

FOREIGN PATENT DOCUMENTS

| | | |
|---|---|---|
| CN | 203391833 U | 1/2014 |
| CN | 204037238 U | 12/2014 |

OTHER PUBLICATIONS

International Search Report and the Written Opinion of the International Searching Authority from corresponding PCT/US2021/045965 dated Nov. 3, 2021.

\* cited by examiner

*Primary Examiner* — John D Walters
(74) *Attorney, Agent, or Firm* — Lando & Anastasi, LLP

(57) ABSTRACT

A wheel locking axle assembly is provided to secure a wheel to a hub of a child conveyance device. An embodiment of the wheel locking assembly includes a hub including a retention feature and a wheel assembly. The wheel assembly includes a wheel, a sleeve coupled to the wheel, a spindle that is slidable within a channel of the sleeve, and at least one detent captured by the sleeve and the spindle. The spindle can be moved between a first longitudinal position with respect to the sleeve in which a portion of each detent extends radially outwardly through a respective through-hole in the sleeve to lockingly engage the retention feature of the hub and a second longitudinal position with respect to the sleeve in which each detent does not extend radially outwardly through the through-hole and disengages the retention feature of the hub.

26 Claims, 15 Drawing Sheets

PUSH ON AXLE FOR STROLLER

BACKGROUND OF THE DISCLOSURE

The present disclosure relates generally to a removable wheel assembly, such as a removable wheel assembly for a child conveyance device. In particular, the present disclosure relates to a wheel locking axle assembly to secure a wheel to a hub of a child conveyance device, such as a stroller.

SUMMARY OF DISCLOSURE

One aspect of the present disclosure is directed to a wheel locking axle assembly to secure a wheel to a hub of a child conveyance device. In one embodiment, the wheel locking assembly comprises a hub including a retention feature and a wheel assembly. The wheel assembly includes a wheel, a sleeve coupled to the wheel, a spindle, and at least one detent. The sleeve includes a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve. The spindle extends within the channel of the sleeve. The spindle includes an outer surface, a first end, and a second end. The spindle is axially slidable within the channel of the sleeve, with the first end of the spindle being positioned proximate the first end of the sleeve and the second end of the spindle being positioned proximate the second end of the sleeve. Each detent is captured by the sleeve and the spindle. The spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub.

In some embodiments, the wheel attachment assembly includes a plurality of external threads located at the first end of the sleeve, an internally threaded lock nut secured to the plurality of external threads, the lock nut being configured to engage a first surface of at least one bearing of a wheel, a snap ring groove defined in the outer surface of the sleeve; and a snap ring received in the snap ring groove, the snap ring being configured to engage a second surface of the at least one bearing such that the at least one bearing is held between the lock nut and the snap ring at a location along the length of the sleeve. In some such embodiments, the axle assembly further comprises a button having an outer surface and an inner surface, and a spring held in compression between the inner surface of the button and the lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

In some embodiments, the axle assembly comprises a button having an outer surface and an inner surface, and a spring held in compression between the inner surface of the button and the lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

In some embodiments, the button is slidably secured to a body of the wheel by at least one screw, and for each screw, a washer is positioned between a surface of a head of the respective screw and a surface of the body of the wheel.

In some embodiments, the axle assembly comprises a first spring held in compression between a first compression surface of the spindle and a second compression surface formed on the inner wall of the sleeve, and a second spring held in compression between the at least one detent and a third compression surface formed on the inner wall of the sleeve. In some such embodiments, the axle assembly includes a button having an outer surface and an inner surface, and a third spring held in compression between the inner surface of the button and the lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

In some embodiments, the spindle includes external threads formed on the first end of the spindle and a cap having internal threads secured to the external threads formed on the first end of the spindle, wherein the first compression surface of the spindle is located on the cap.

In some embodiments, the axle assembly comprises a slot defined in the second end of the spindle.

In some embodiments, the axle assembly comprises a washer positioned between the second spring and the at least one detent.

In some embodiments, the axle assembly comprises a pin extending radially inwardly from the inner surface of the sleeve, the pin having a pin surface that engages the washer to limit the expansion of the second spring.

In some embodiments, the axle assembly comprises a retaining ring secured to the outer surface of the spindle, the retaining ring engaging the third compression surface of the sleeve to limit the expansion of the first spring.

In some embodiments, the through-hole is radially tapered such that the through-hole is narrower towards the outer surface of the sleeve than towards the inner surface of the sleeve.

In some embodiments, the spindle includes a ramped surface adjacent a flat surface of a recess defined in the outer surface of the spindle and located near the second end of the spindle, the ramped surface extending from a first ramp edge that is adjacent the flat surface to a second ramp edge that is adjacent to the outer surface of the spindle, the first ramp edge being radially inward of the second ramp edge, and the second ramp edge being longitudinally between the first ramp edge and the second end of the spindle.

Another aspect of the present disclosure is directed to a child conveyance device comprising a frame, a seat coupled to the frame, a plurality of hubs, each hub including a retention feature, a plurality of wheel assemblies. At least one of the wheel assemblies includes a wheel configured to be releasably secured to one of the hubs, a sleeve coupled to the wheel, a spindle, and at least one detent. The sleeve includes a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve. The spindle extends within the channel of the sleeve. The spindle includes an outer surface, a first end, and a second end. The spindle is axially slidable within the channel of the sleeve, with the first end of the spindle being positioned proximate the first end of the sleeve and the second end of the spindle being positioned proximate the second end of the sleeve. Each detent is captured by the sleeve and the spindle. The spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub.

In some embodiments, the wheel attachment assembly includes a plurality of external threads located at the first end of the sleeve, an internally threaded lock nut secured to the plurality of external threads, the lock nut being configured to engage a first surface of at least one bearing of a wheel, a snap ring groove defined in the outer surface of the sleeve; and a snap ring received in the snap ring groove, the snap ring being configured to engage a second surface of the at least one bearing such that the at least one bearing is held between the lock nut and the snap ring at a location along the length of the sleeve. In some such embodiments, the child conveyance device further comprises a button having an outer surface and an inner surface, and a spring held in compression between the inner surface of the button and the lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

In some embodiments, the child conveyance device comprises a button having an outer surface and an inner surface, and a spring held in compression between the inner surface of the button and the lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

In some embodiments, the button is slidably secured to a body of the wheel by at least one screw, and for each screw, a washer is positioned between a surface of a head of the respective screw and a surface of the body of the wheel.

In some embodiments, the child conveyance device comprises a first spring held in compression between a first compression surface of the spindle and a second compression surface formed on the inner wall of the sleeve, and a second spring held in compression between the at least one detent and a third compression surface formed on the inner wall of the sleeve. In some such embodiments, the child conveyance device comprises a button having an outer surface and an inner surface, and a third spring held in compression between the inner surface of the button and the lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

In some embodiments, the spindle includes external threads formed on the first end of the spindle, and a cap having internal threads secured to the external threads formed on the first end of the spindle, wherein the first compression surface of the spindle is located on the cap.

In some embodiments, the child conveyance device comprises a slot defined in the second end of the spindle.

In some embodiments, the child conveyance device comprises a washer positioned between the second spring and the at least one detent.

In some embodiments, the child conveyance device comprises a pin extending radially inwardly from the inner surface of the sleeve, the pin having a pin surface that engages the washer to limit the expansion of the second spring.

In some embodiments, the child conveyance device comprises a retaining ring secured to the outer surface of the spindle, the retaining ring engaging the third compression surface of the sleeve to limit the expansion of the first spring.

In some embodiments, the through-hole is radially tapered such that the through-hole is narrower towards the outer surface of the sleeve than towards the inner surface of the sleeve.

In some embodiments, the spindle includes a ramped surface adjacent a flat surface of a recess defined in the outer surface of the spindle and located near the second end of the spindle, the ramped surface extending from a first ramp edge that is adjacent the flat surface to a second ramp edge that is adjacent to the outer surface of the spindle, the first ramp edge being radially inward of the second ramp edge, and the second ramp edge being longitudinally between the first ramp edge and the second end of the spindle.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

DETAILED DESCRIPTION

Known strollers for children include removable wheels, which can make it easier for a user to store the stroller or to transport the stroller in an automobile. However, when a user removes one of the wheels from such a stroller or when a user reattaches the wheel to the stroller, the user's fingers can easily be pinched, for example, between a surface of the wheel and a surface on a frame of the stroller.

The present disclosure provides a child conveyance device with at least one wheel locking assembly as described herein. The present disclosure also provides a wheel locking axle assembly including a wheel assembly that is removably securable to a hub of a child conveyance device, such as a stroller. A user can secure the wheel assembly to the hub by simply pushing the wheel assembly in a first direction towards the hub. During this step of securing the wheel assembly to the hub, the user's fingers do not need to be positioned between any part of the wheel assembly and the hub. A user can remove the wheel assembly from the hub by pushing a button towards the hub and pulling the wheel assembly in a second direction away from the hub. Pushing the button towards the hub causes a retention member of the wheel assembly to disengage a retention feature, such as a retention surface, of the hub. During this step of removing the wheel assembly, the user's fingers are not positioned between any part of the wheel assembly and the hub. In this way, the present disclosure provides a wheel locking axle assembly that avoids pinching a user's fingers when the user secures the wheel assembly to the hub and when the user removes the wheel assembly from the hub.

The wheel locking assembly provides a rigid connection between the wheel assembly and the hub. The various components may be made of materials known in the art. In some embodiments, the retention members and surfaces are made of metal. In some embodiments, these components are made of steel.

Figure 1:
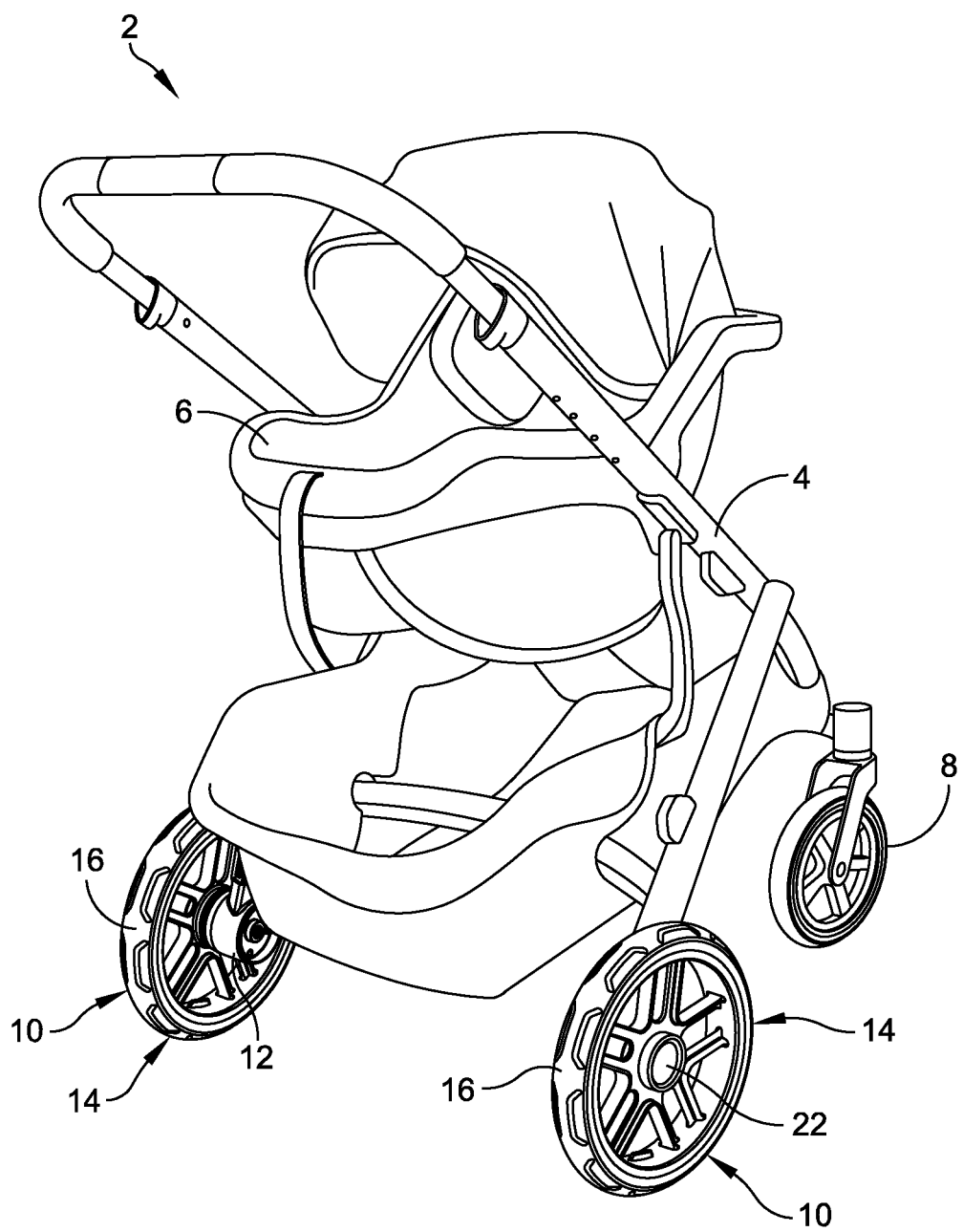
FIG. 1 shows a perspective view of an embodiment of a child conveyance device of the present disclosure.

Turning now to the drawings, and more particularly to FIG. 1, an exemplary embodiment of a child conveyance device is generally indicated at 2. The child conveyance device includes a frame 4 that supports a seat 6 for a child. The frame 4 includes four wheels including two front wheels 8 (one of which is visible in FIG. 1) and two wheel locking axle assemblies of the present disclosure, each generally indicated at 10, which each include a hub 12 of the child conveyance device and a wheel assembly, generally indicated at 14. When a user pushes the frame 4, the front wheels 8 and the wheel assemblies 14 at the rear of the frame roll along a surface.

Although the child conveyance device 2 of FIG. 1 includes two wheel locking axle assemblies 10, other embodiments of a child conveyance device could include more or fewer wheel locking axle assemblies 10. For example, embodiments of a child conveyance device could include four or more wheel locking axle assemblies 10. In some embodiments, the child conveyance device is a three-wheeled child conveyance device, including at least one wheel locking axle assembly 10. In some embodiments, the child conveyance device is a three-wheeled child conveyance device, including at least two wheel locking axle assemblies 10.

Figure 2:
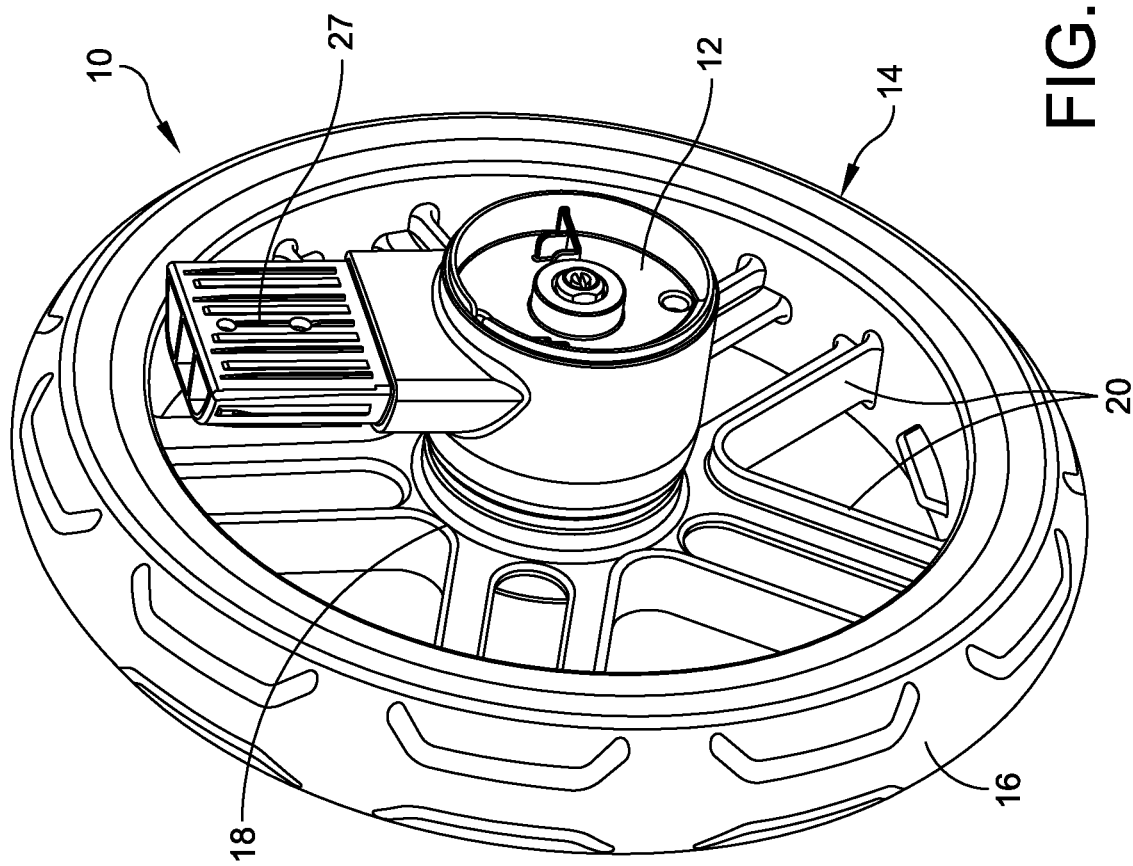
FIG. 2 shows a perspective view of an embodiment of a wheel locking assembly of the present disclosure, including a wheel assembly secured to a hub.
Figure 3:
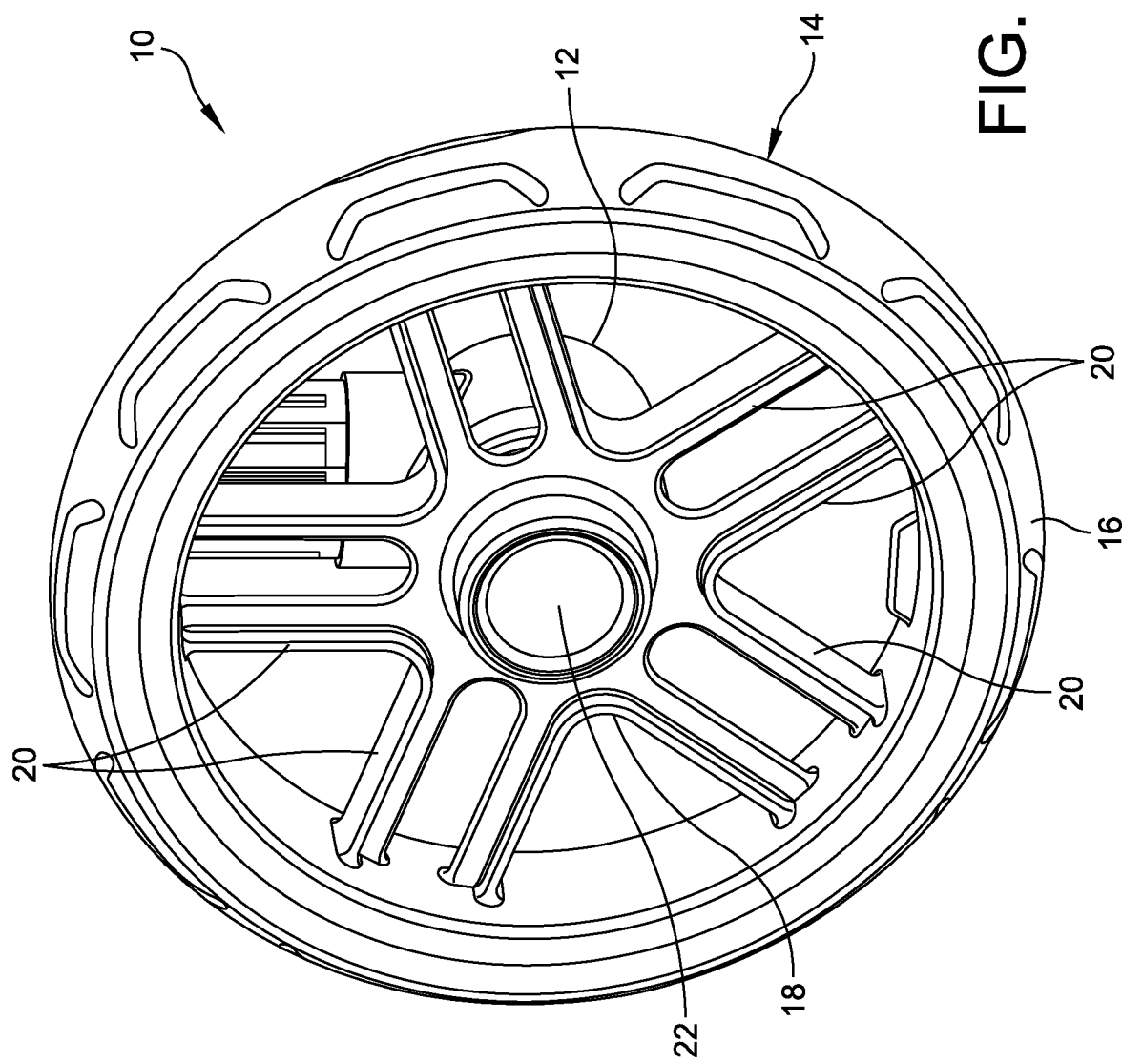
FIG. 3 shows another perspective view of the embodiment of FIG. 2.

The wheel locking axle assembly 10 may be provided separately from the frame 4 of the child conveyance device 2, as shown in FIGS. 2 and 3. Referring to FIG. 2, the wheel locking axle assembly 10 includes the hub 12 of the child conveyance device and the wheel assembly 14, that is removably securable to the hub. The hub 12 and the wheel assembly 14 are described in further detail below. The wheel assembly 14 includes a tread 16, such as a rubber tread, for engaging a support surface, such as the ground. The tread 16 extends circumferentially around a body or rim 18 that has spokes 20. FIG. 3 shows another perspective view of the wheel assembly 14 secured to the hub 12.

Regarding the general operation of the wheel locking axle assembly 10, a user can secure the wheel assembly 14 to the hub 12 and can remove the wheel assembly 14 from the hub 12. To allow the user to remove the wheel assembly 14 from the hub 12, the wheel assembly 14 includes a button 22. To remove the wheel assembly 14 from the hub 12, a user grips the wheel assembly 14, such as by the tread 16 and/or the spokes 20 or another part of the body 18 of the wheel assembly 14, and the user pushes the button 22 on the wheel assembly 14 in a direction towards the hub 12. The user may accomplish this step by gripping the wheel assembly 14 by the spokes 20 or by the tread 16 of the wheel assembly 14 with the user's fingers and then depressing the button 22 with the user's thumbs. In some embodiments, this may be a single-handed operation. While pushing the button 22 towards the hub 12, the user pulls the wheel assembly 14 in the opposite direction away from the hub 12, and the wheel assembly 14 is free from the hub 12, as shown in FIGS. 4A and 4B.

Figure 4A:
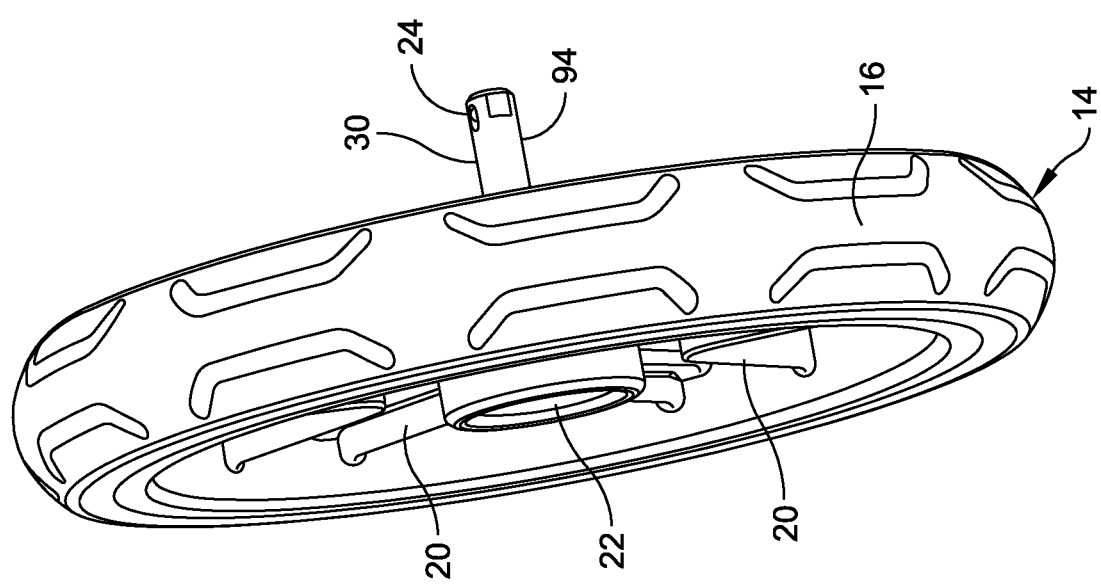
FIG. 4A shows a perspective view of a wheel assembly of the wheel locking assembly of FIG. 2, without the hub of the wheel locking assembly of FIG. 2.
Figure 4B:
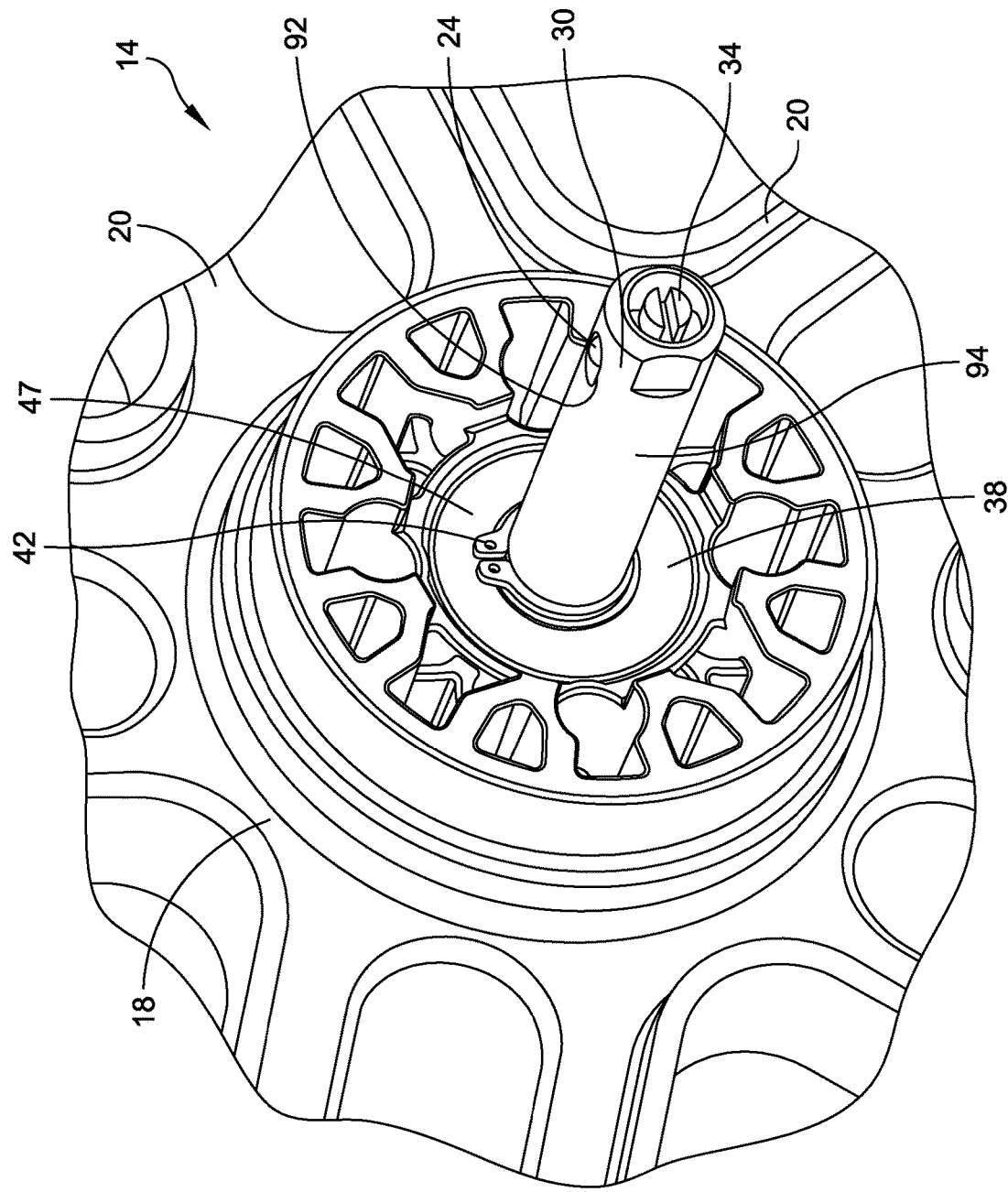
FIG. 4B shows an enlarged perspective view of the wheel assembly of FIG. 4A.
Figure 5:
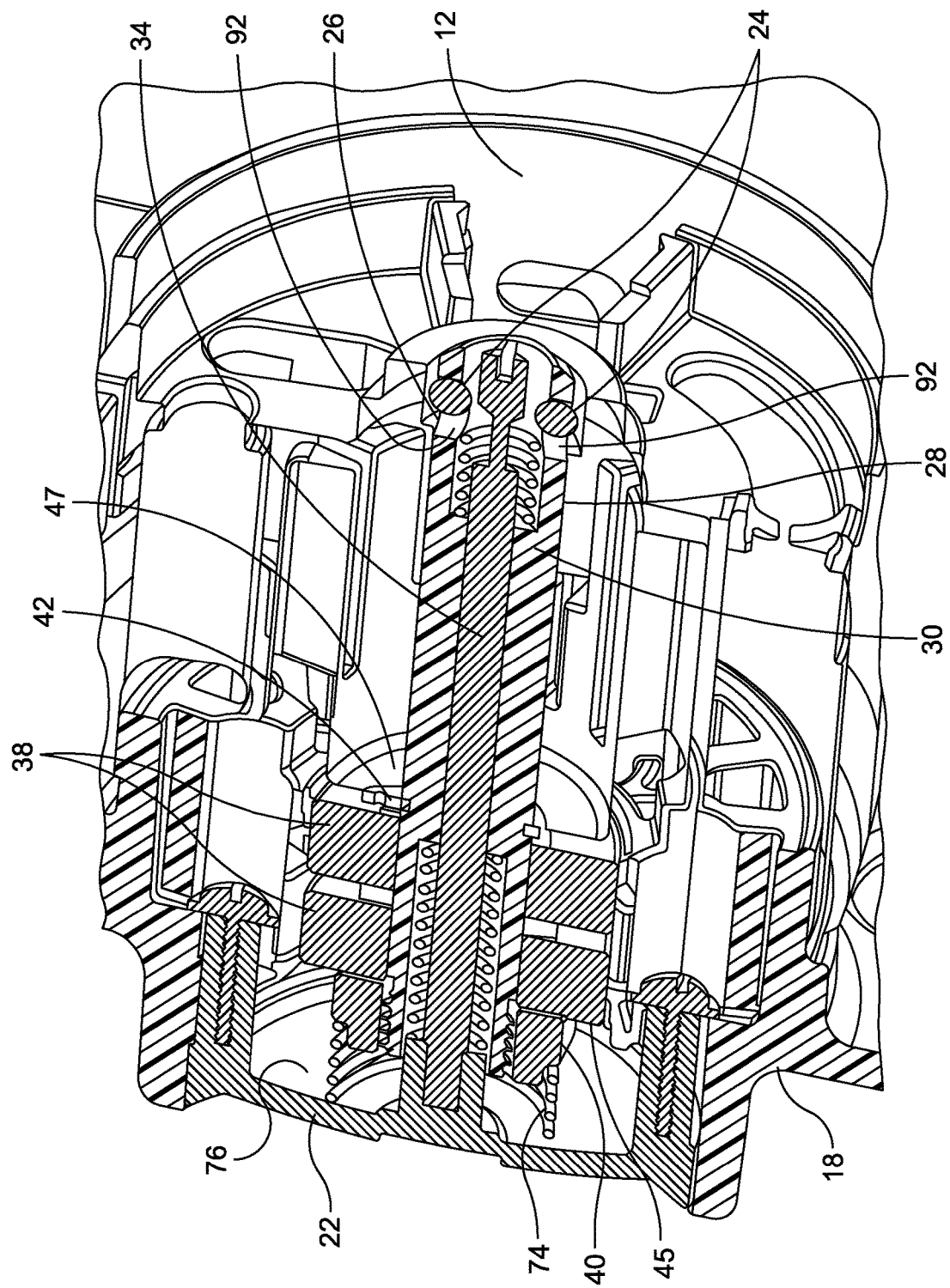
FIG. 5 shows a sectional view of the embodiment of FIG. 2.

In particular, as shown in FIGS. 4A and 4B, which show the wheel assembly 14 separated from the hub 12, the wheel assembly includes two retention members in the form of two detents 24 that are configured to engage a retention feature, such as a retention surface on the hub 12. When the wheel assembly 14 is secured to the hub 12, as shown in FIG. 5, the two detents 24 that are positioned on the wheel assembly 14 engage a retention surface 26 on the hub 12. In FIGS. 4A and 4B, the detents 24 are shown as spherical balls.

Figure 7:
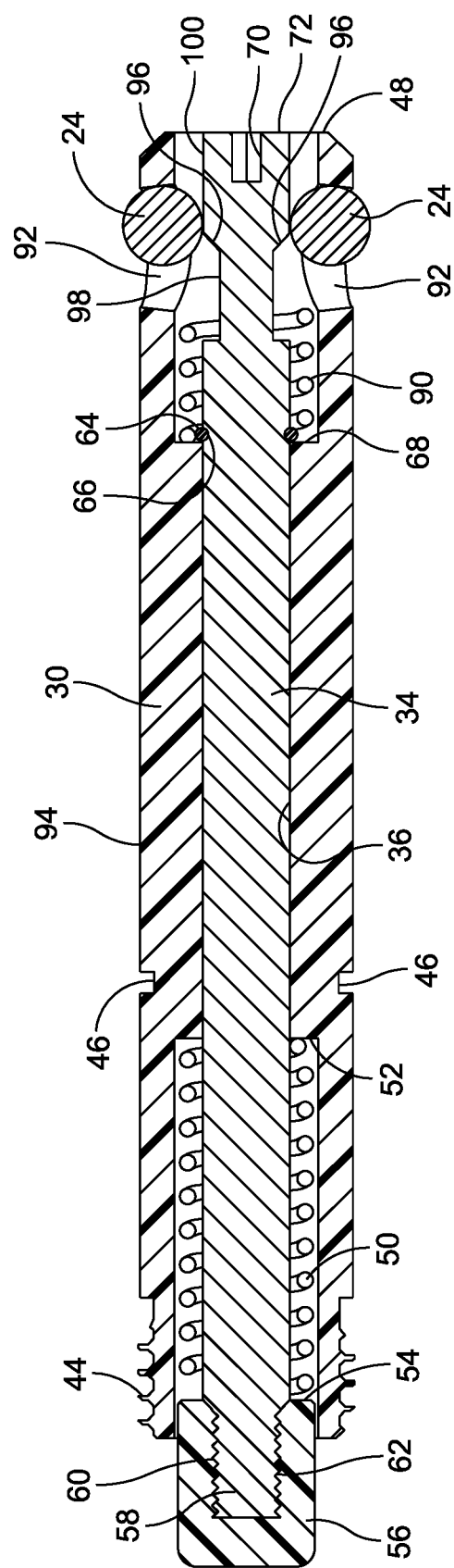
FIG. 7 shows a sectional view of components of the wheel assembly of FIG. 4A including a spindle that is in a first position relative to a sleeve.
Figure 8:
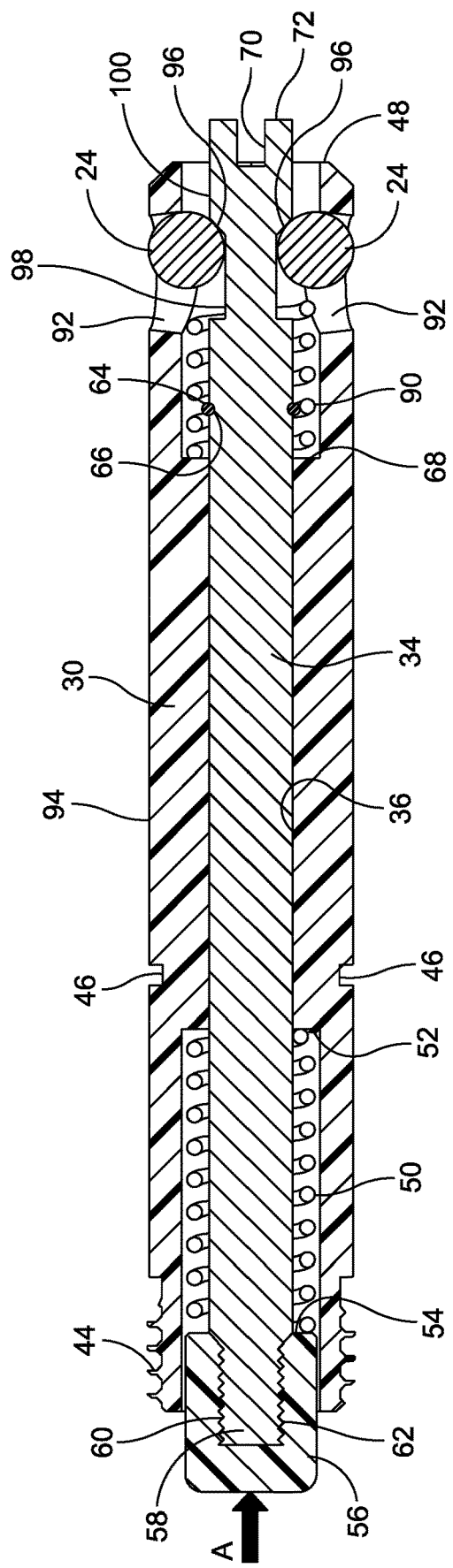
FIG. 8 shows another view of the components of FIG. 7, with the spindle moved to a second position relative to the sleeve.

However, when the button 22 is depressed, the two detents 24 of the wheel assembly 14 are allowed to disengage the retention surface 26 on the hub 12. FIGS. 7 and 8 show how components of the wheel assembly move in response to the button being depressed along direction A, and how the detents 24 are allowed to move radially inwardly in response to the button being depressed. The operation of the button 22, the detents 24, and the retention surface 26 is described in further detail below.

In FIGS. 2 and 3, the hub 12 is shown separately from the frame of the child conveyance device. In some embodiments, the hub 12 is part of the frame of the child conveyance device. In other embodiments, the hub 12 is formed separately from the frame of the child conveyance device and is secured to the frame of the child conveyance device.

The hub 12 includes an attachment structure 27 (FIG. 2) that can be secured to the frame of the child conveyance device, such as by fasteners, a press fit, or another securing means. When the hub 12 is secured to the frame of the child conveyance device, it may be positionally and rotationally fixed to the frame of the child conveyance device.

As shown in FIG. 5, to facilitate securing the wheel assembly 14 to the hub 12, the hub includes a hub channel 28 that is configured to receive a sleeve 30 of the wheel assembly 14, which is discussed in further detail below. An inner surface of the hub channel 28 is configured to engage an outer surface of the sleeve 30 of the wheel assembly 14 when the sleeve 30 of the wheel assembly 14 is received in the hub channel 28.

To lock the wheel assembly 14 to the hub 12 when the sleeve 30 of the wheel assembly 14 is received in the hub channel 28, the hub 12 includes a retention feature, namely the retention surface 26. The retention surface 26 is configured to engage at least one of the detents 24 of the wheel assembly 14, which is described in further detail below.

Figure 6:
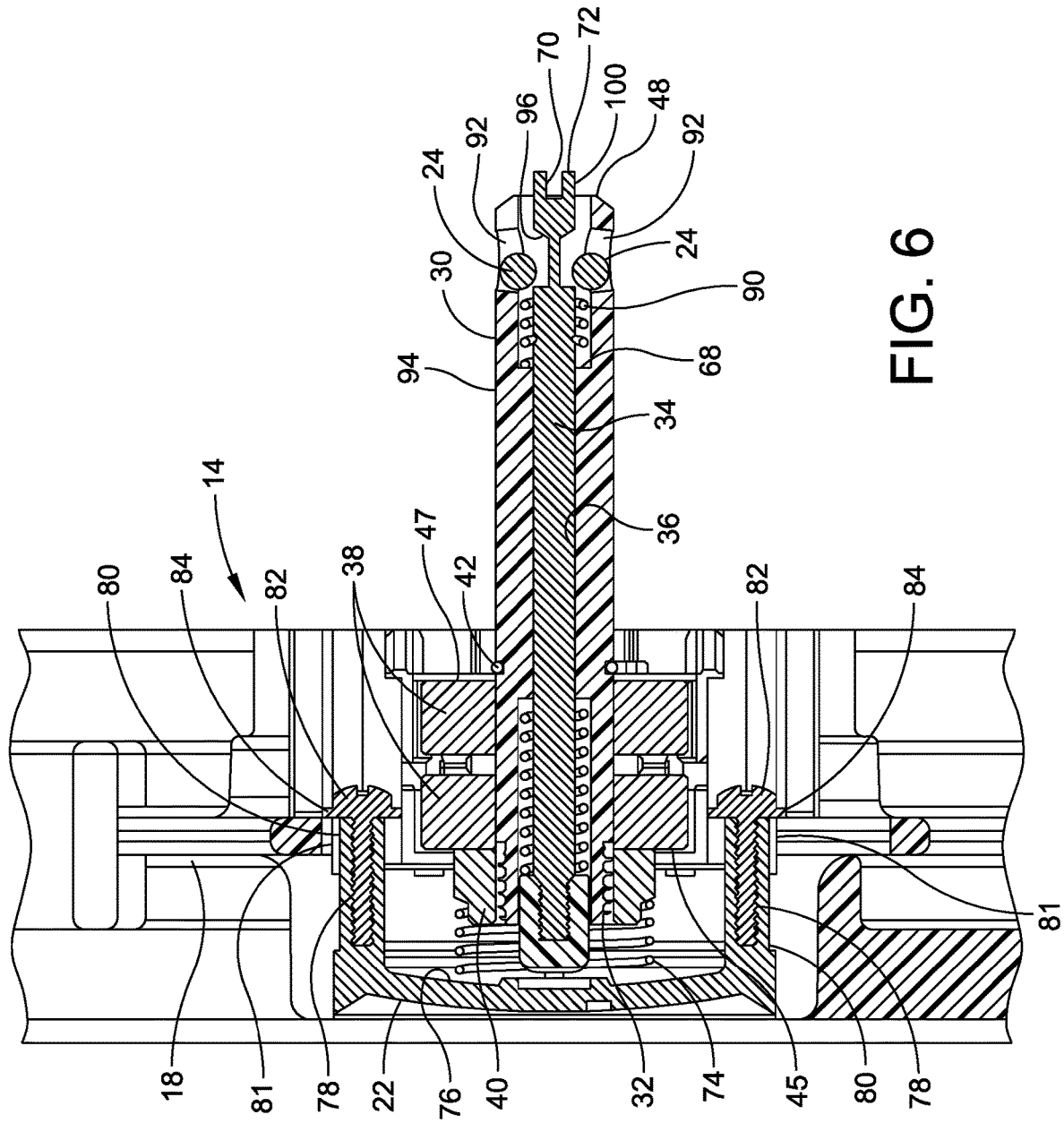
FIG. 6 shows a sectional view of the wheel assembly as shown in FIG. 4A.

As shown in FIG. 6, the wheel assembly 14 includes the body 18 of the wheel assembly, the sleeve 30 coupled to the body 18 of the wheel assembly and having a wheel attachment assembly near a first end 32 of the sleeve, a spindle 34 that extends within a channel 36 of the sleeve 30, and the detents 24 captured by the sleeve 30 and the spindle 34. As described in further detail below, each detent 24 is biased radially outwardly with respect to the sleeve 30 to engage the retention surface 26 of the hub 12. The wheel assembly 14 also includes two bearings 38 that are secured to the body 18 of the wheel.

The body 18 of the wheel assembly 14 is rotatable about the hub 12. The sleeve 30 acts as an axle about which the body 18 of the wheel assembly can rotate relative to the hub 12 when the sleeve 30 is secured to the hub.

The sleeve 30 of the wheel attachment assembly is secured to the body 18 of the wheel by a lock nut 40 and a snap ring 42 that capture the bearings 38 of the wheel between the lock nut 40 and the snap ring 42, as shown in FIG. 6.

To secure the lock nut 40 to the sleeve 30, a plurality of external threads 44 are located at the first end 32 of the sleeve, as shown in FIGS. 6-9. The lock nut 40 is internally threaded and is secured to the plurality of external threads 44. The lock nut 40 includes a surface that is configured to engage a first surface 45 of the bearings 38 of the wheel.

To secure the snap ring 42 on the opposite side of the bearings 38, a snap ring groove 46 is defined in the outer surface of the sleeve 30, as shown in FIG. 7. The snap ring 42 is received in the snap ring groove 46. The snap ring 42 includes a surface that engages a second surface 47 of the bearings 38 of the wheel. In this way, the bearings 38 of the wheel are held at a location along the length of the sleeve 30 by the surface of the lock nut 40 and the surface of the snap ring 42.

The spindle 34 is movable within the sleeve 30. In particular, the spindle 34 is slidably received within the sleeve 30 so the spindle 34 can slide axially within the sleeve 30. When the button 22 is not depressed, the spindle 34 is in a first position with respect to the sleeve 30, as shown in FIG. 7. When a user depresses the button a sufficient distance, the button 22 engages a surface on the spindle 34 and moves the spindle 34 within the sleeve 30 away from the first end 32 of the sleeve and towards a second end 48 of the sleeve 30 so that the spindle 34 is moved to a second position with respect to the sleeve 30, as shown in FIG. 8. Movement of the spindle 34 within the sleeve 30 allows the detents 24 to disengage the retention surface 26 of the hub 12, as described in further detail below.

The spindle 34 is biased to the first position with respect the sleeve 30, as shown in FIG. 7, by a first spring 50 that is captured between the spindle 34 and the sleeve 30. The first spring 50 is held in compression between a first compression surface 52 that is formed on an inner wall of the channel 36 the sleeve and a complementary compression surface 54 of the spindle. In one embodiment, the spindle 34 includes a cap 56 that is secured to a first end 58 of the spindle 34. In one embodiment, the compression surface 54 of the spindle 34 is located on the cap 56. The cap 56 includes internal threads 60 that are secured to external threads 62 formed on the first end 58 of the spindle.

To limit expansion of the first spring 50, the spindle 34 includes a retaining ring 64. The retaining ring 64 is secured in a groove 66 that is defined on the outer surface of the spindle 34 and engages a second compression surface 68 that is formed on the inner wall of the sleeve 30.

To facilitate assembly of the wheel assembly 14, the spindle 34 includes a slot 70 defined in a second end 72 of the spindle 34 to allow the user to secure the cap 56 to the spindle 34. Once the spindle 34 is received within the sleeve 30 and the first spring 50 is received in the space between the sleeve 30 and the spindle 34, a user inserts a head of a flathead screwdriver into the slot 70 to rotationally secure the spindle 34 about the axis of the spindle 34 and the user rotates the cap 56 by hand or with a tool onto the first end 58 of the spindle 34.

As described above, while the spindle 34 is biased to the first position with respect to the sleeve 30 by the first spring 50, a user can oppose that bias by depressing the button 22, thereby causing the button 22 to engage the cap 56 on the spindle 34 and move the spindle 34 laterally in the opposite direction to the second position with respect to the sleeve 30.

As shown in FIG. 6, the button 22 is biased away from the cap 56 by a spring 74 that is in compression between an inner button surface 76 and the lock nut 40.

Figure 10:
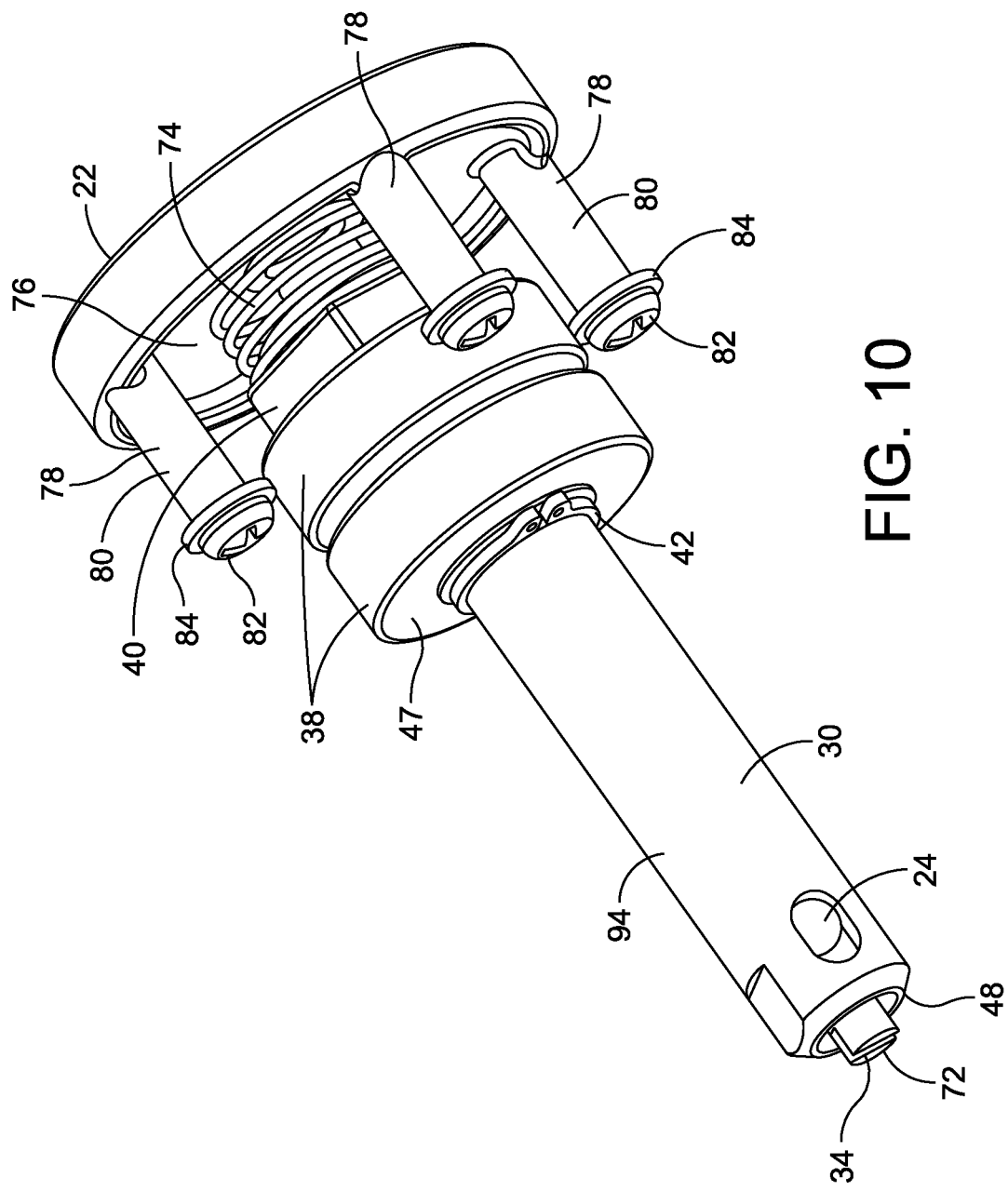
FIG. 10 shows a perspective view of components of the wheel assembly of FIG. 4A without the wheel.

As shown in FIGS. 6 and 10, the button 22 is slidably secured to the body 18 of the wheel by travel limiters 78 that limit expansion of the spring 74. Each travel limiter 78 includes a sleeve 80 is secured to the button 22 and that extends through a respective hole 81 defined in the body 18 of the wheel. Fasteners 82, such as screws, are received in each respective sleeve 80. For each fastener 82, a flange 84 of the respective fastener 82 engages a surface of the body 18 of the wheel. In this way, the spring 74 is held in compression between the inner button surface 76 and the lock nut 40, which is secured to the body 18 of the wheel. In some embodiments, each fastener includes a washer that is positioned between a surface of a head of the respective fastener 82 and a surface of the body 18 of the wheel.

By pushing on the button 22, a user can cause the button to engage the first end of the spindle, such as the cap on the first end of the spindle, to slide the spindle 34 within the sleeve 30. When a user applies a sufficient longitudinal force on the outer surface of the button 22, the inner surface 76 of the button 22 engages the cap 56 on the first end 58 of the spindle 34 to translate the spindle 34 laterally from the first longitudinal position with respect to the sleeve 30 to the second longitudinal position with respect to the sleeve. To remove the wheel assembly 14 from the hub 12, the user pushes the button 22 inwardly and pulls the wheel assembly 14 away from the hub 12 along the axis of the spindle 34 and the sleeve 30.

This removal of the wheel assembly 14 from the hub 12 is possible because sliding the spindle 34 from the first position with respect to the sleeve 30 to the second position with respect to the sleeve 30 allows the detents 24 to move radially inwardly in the sleeve 30 to disengage the retention surface 26 on the hub 12. A spring 90 that is held in compression between the second compression surface 68 of the sleeve 30 and the detents 24 urges the detents 24 towards the second end 48 of the sleeve 30. Due to the interaction of the spring 90 and surfaces on the spindle 34 that are described in further detail below, the spring 90 and the spindle 34 urge the detents 24 radially outwardly through through-holes 92 to extend beyond an outer surface 94 of the sleeve 30. When the spindle 34 moves from the first position to the second position with respect to the sleeve 30, the spring 90 is allowed to expand. The resulting decreased force from the spring 90 on the detents 24 allows the detents 24 to move radially inwardly with respect to the sleeve and into the space defined between the spindle 34 and the sleeve 30. In particular, the detents 24 can be moved radially inwardly by the retention surface 26 on the hub 12 when a user depresses the button 22 and pulls the sleeve 30 of the wheel assembly 14 away from the hub 12.

The detents 24 are captured by the spindle 34 and the sleeve 30. A surface of the spindle 34 and the tapered through-hole of the sleeve 30 capture the detent between the spindle 34 and the sleeve 30 near the second end 48 of the sleeve 30. The spring 90 is held in compression and engages the detents 24 to bias the detents 24 towards a ramped surface 96 so the detents 24 are biased to move radially outwardly into the respective through-holes 92 by cooperation of the spring 90 and the ramped surface 96.

The ramped 96 surface of the spindle 34 is adjacent to a flat surface 98 of a recess defined in the outer surface of the spindle 34 and located near the second end 72 of the spindle 34. The ramped surface 96 extends from a first ramp edge that is adjacent to the flat surface 98 to a second ramp edge that is adjacent to an outer surface 100 of the spindle 34. The first ramp edge is radially inward of the second ramp edge, and the second ramp edge is longitudinally between the first ramp edge and the second end 72 of the spindle 34.

Figure 11:
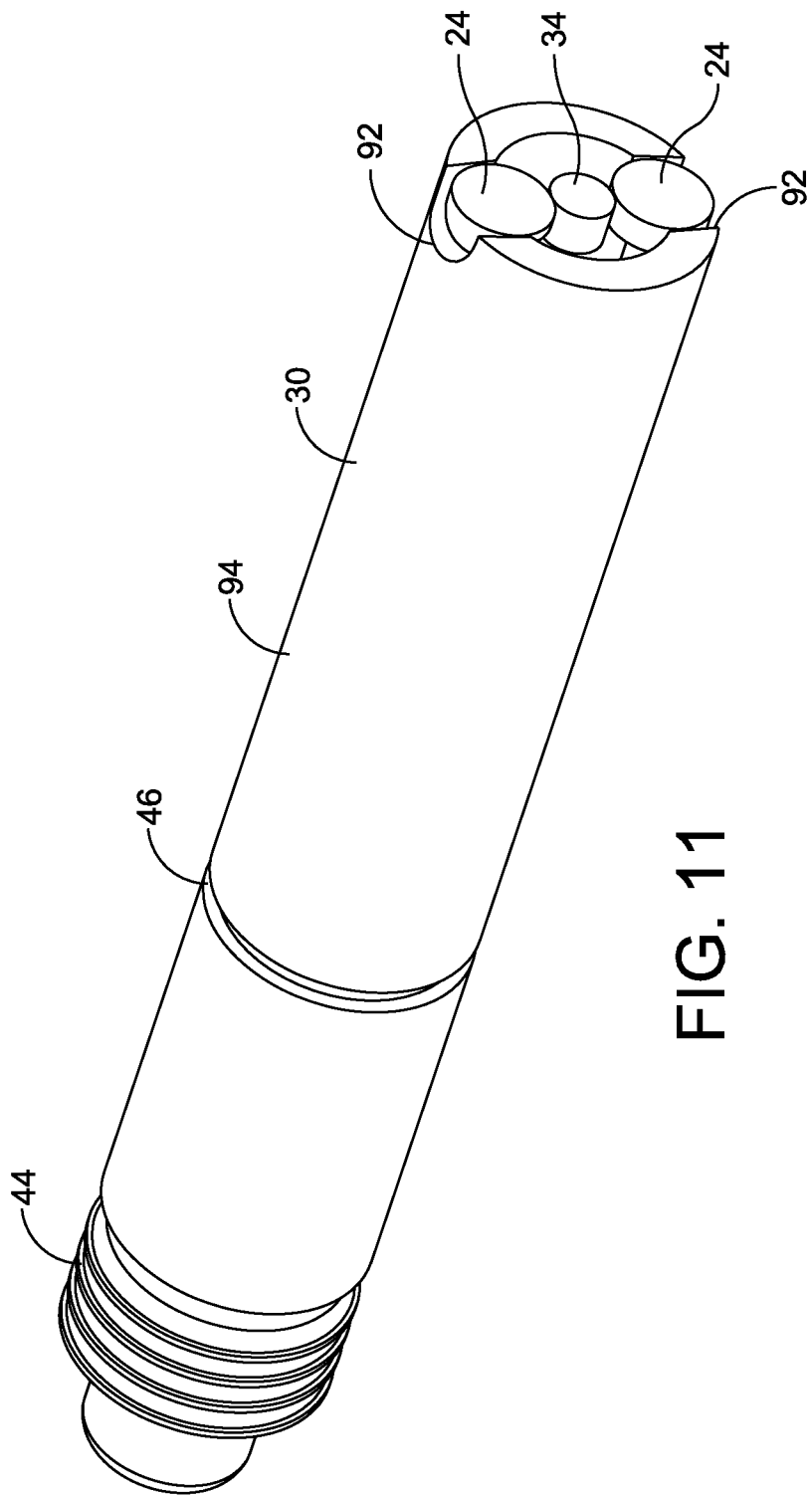
FIG. 11 shows a sectional perspective view of the spindle and the sleeve of the wheel assembly of FIG. 4A.
Figure 12:
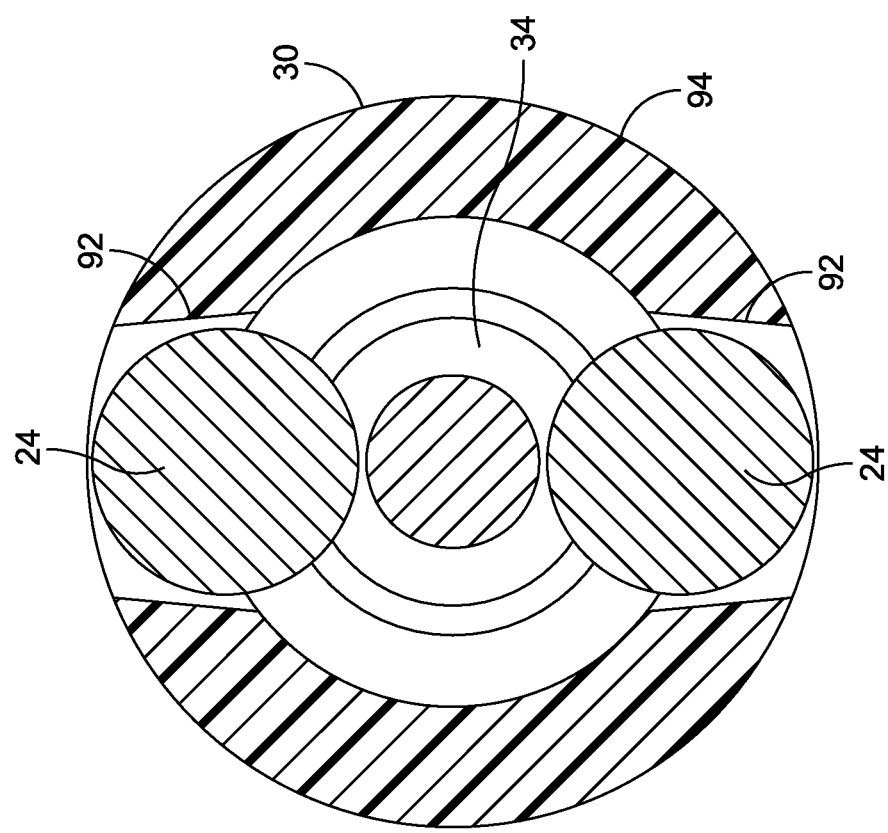
FIG. 12 shows a sectional view of FIG. 11.

While the spring 90 and the ramped surface 96 tend to urge the detents 24 radially outwardly with respect to the sleeve 30, the respective through-holes 92 retain the detents 24 within the sleeve 30. To retain the detents 24 in the through-holes 92, the diameter of each through-hole at the radially outer end of the through-hole is smaller than the diameter of the detent 24. Each through-hole 92 is radially tapered such that the through-hole 92 is narrower towards the outer surface of the sleeve than towards the inner surface of the sleeve, as shown in FIGS. 11 and 12. This allows each detent 24 to move radially outward within the through-hole 92 while preventing the detent 24 from passing entirely through the through-hole 92.

When the spindle 34 is in the first position with respect to the sleeve 30, as shown in FIG. 7, the force of the spring 90 pushes the detents 24 towards the radially outer end of the ramped surface 96, so the detents 24 are seated in radially outward positions in the through-holes 92. When the spindle 34 is in the second position with respect to the sleeve 30, the decreased force of the spring 90 allows the detents 24 to be pushed back against the recessed flat surface 98 of the spindle 34 by the retention surface 26 of the hub 12 when a user pulls the wheel assembly 14 away from the hub 12.

Returning to FIGS. 7-9, the wheel assembly 14 is easily securable to the hub 12 and easily removable from the hub 12 while avoiding pinching a user's fingers. FIG. 7 shows the spindle 34 in the first position relative to the sleeve 30. In FIG. 7, the detents 24 extend radially beyond the outer surface 94 of the sleeve 30 to engage the retention surface 26 of the hub 12. When a user wishes to disengage the wheel assembly 14 from the hub 12, the user pushes the button 22 along direction A, shown in FIG. 8. This causes the inner button surface 76 to engage the cap 56 and move the spindle 34 to the second position relative to the sleeve 30. In the second position, as discussed above, the detents 24 can be pushed radially inwardly as the user pulls the wheel assembly 14 in a direction opposite to the direction A. As the user pulls the wheel assembly 14, the retention surface 26 engages the round surface of the detents 24 to cause the detents 24 to move radially inwardly as the sleeve 30 slides through the channel 28 of the hub 12. Subsequently, when a user wishes to reattach the wheel assembly 14 to the hub 12, the user aligns the sleeve 30 with the channel 28 of the hub 12 and pushes the sleeve 30 into the channel 28. As the portion of the sleeve 30 that includes the detents 24 enters the channel 28, the detents 24 are pushed down the ramp 96, and thus radially inwardly, by the channel, so the detents 24 are at the position shown in FIG. 9 as the detents 24 pass through the channel 28. Once the detents 24 slide through to the other end of the channel and past the retention surface 26, the spring 90 and the ramp 96 cooperate to urge the detents 24 radially outwardly to extend beyond the outer surface 94 of the sleeve, and the components return to the configuration shown in FIG. 7.

Figure 9:
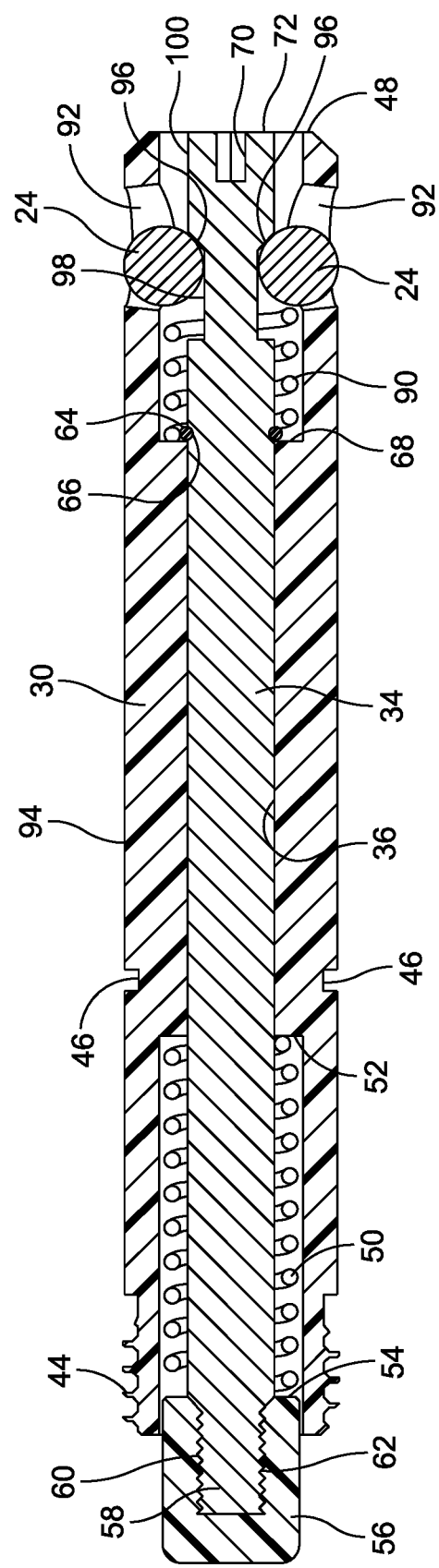
FIG. 9 shows another view of the components of FIG. 7, with the spindle in the first position relative to the sleeve, showing the position of a detent as the wheel assembly is pushed onto a hub.

As shown in FIG. 9, the retention surface 26 causes the slides the sleeve 30 through the channel 28 along the direction.

Figure 13:
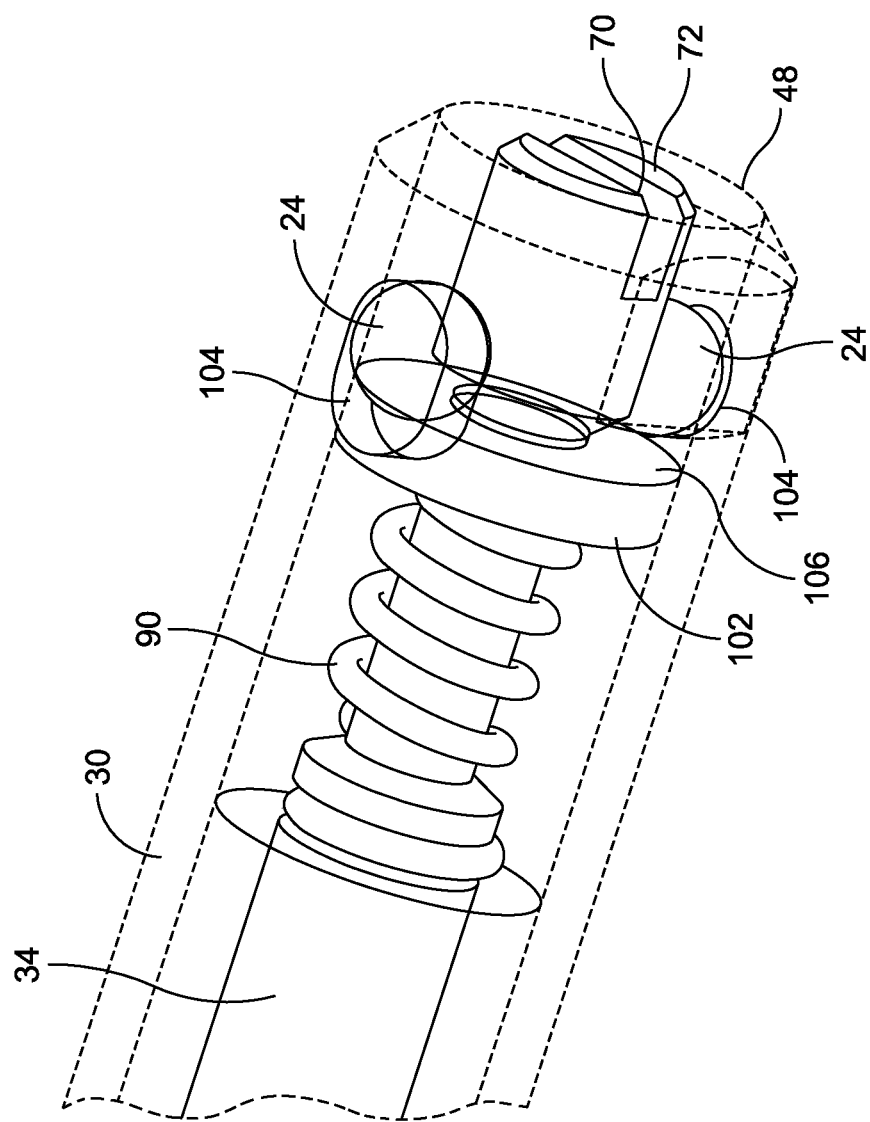
FIG. 13 shows a partially transparent perspective view of components of a second embodiment of a wheel assembly according to the present disclosure.
Figure 14:
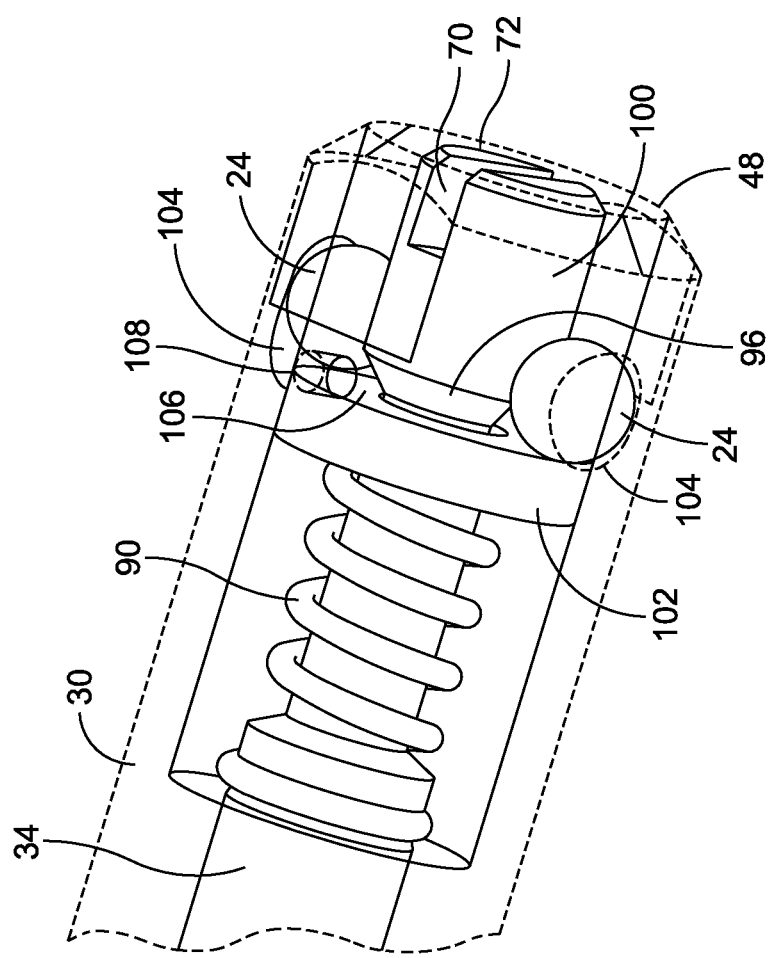
FIG. 14 shows another partially transparent perspective view of the embodiment shown in FIG. 13.

Turning now to a second embodiment, in which similar parts are identified by the reference numbers used to describe the wheel locking assembly 10, FIGS. 13 and 14 show a portion of a second embodiment of the wheel assembly of that is similar to the embodiment described above, except the second embodiment of the wheel assembly includes a washer 102 that is positioned between the spring 90 and the detents 24, and the detents 24 extend through slightly different shaped tapered through-holes 104 in the sleeve 30.

In the embodiment of FIGS. 13 and 14, instead of relying on just the spring 90, this embodiment uses the washer 102 between the spring 90 and detents 24 to provide a washer surface for applying pressure on the detents 24.

The washer 102 includes a flat surface 106 that engages the detents 24. In FIGS. 13 and 14, the spherical detents 24 can roll along the flat surface 106 of the washer 102 as the detents 24 move inwardly or outwardly with respect to the sleeve 30.

To limit movement of the washer 102 in the direction towards the second end 48 of the sleeve 30, a pin 108 extends radially inwardly from the inner surface of the sleeve 30, the pin 108 has a pin surface that engages the washer to limit translation of the washer 102 with respect to the sleeve 30, thereby limiting the expansion of the second spring 90.

The cross hatching shown in FIGS. 1-14 does not indicate any particular material.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A wheel locking axle assembly to secure a wheel to a hub of a child conveyance device, the wheel locking assembly comprising:
    a hub including a retention feature; and
    a wheel assembly including
        a wheel,
        a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve,
        a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and
        at least one detent captured by the sleeve and the spindle,
    wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and
    wherein the wheel attachment assembly includes
        a plurality of external threads located at the first end of the sleeve,
        an internally threaded lock nut secured to the plurality of external threads, the lock nut being configured to engage a first surface of at least one bearing of the wheel,
        a snap ring groove defined in the outer surface of the sleeve, and
        a snap ring received in the snap ring groove, the snap ring being configured to engage a second surface of the at least one bearing such that the at least one bearing is held between the lock nut and the snap ring at a location along the length of the sleeve.

2. The axle assembly of claim 1, further comprising
    a button having an outer surface and an inner surface, and
    a spring held in compression between the inner surface of the button and the lock nut,
    wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

3. A wheel locking axle assembly to secure a wheel to a hub of a child conveyance device, the wheel locking assembly comprising:
    a hub including a retention feature;
    a wheel assembly including
        a wheel,
        a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve,
        a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and
        at least one detent captured by the sleeve and the spindle;
    a button having an outer surface and an inner surface; and
    a spring held in compression between the inner surface of the button and a lock nut,
    wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and
    wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

4. The axle assembly of claim 3, wherein the button is slidably secured to a body of the wheel by at least one screw, and for each screw, a washer is positioned between a surface of a head of the respective screw and a surface of the body of the wheel.

5. A wheel locking axle assembly to secure a wheel to a hub of a child conveyance device, the wheel locking assembly comprising:
    a hub including a retention feature;
    a wheel assembly including
        a wheel, a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve, a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and at least one detent captured by the sleeve and the spindle;

a first spring held in compression between a first compression surface of the spindle and a second compression surface formed on the inner surface of the sleeve; and a second spring held in compression between the at least one detent and a third compression surface formed on the inner surface of the sleeve, wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub.

6. The axle assembly of claim 5, further comprising a button having an outer surface and an inner surface; and a third spring held in compression between the inner surface of the button and a lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

7. The axle assembly of claim 5, wherein the spindle further includes external threads formed on the first end of the spindle; and a cap having internal threads secured to the external threads formed on the first end of the spindle, wherein the first compression surface of the spindle is located on the cap.

8. The axle assembly of claim 7, further comprising a slot defined in the second end of the spindle.

9. The axle assembly of claim 5, further comprising a washer positioned between the second spring and the at least one detent.

10. The axle assembly of claim 9, further comprising a pin extending radially inwardly from the inner surface of the sleeve, the pin having a pin surface that engages the washer to limit the expansion of the second spring.

11. The axle assembly of claim 5, further comprising a retaining ring secured to the outer surface of the spindle, the retaining ring engaging the third compression surface of the sleeve to limit the expansion of the first spring.

12. A wheel locking axle assembly to secure a wheel to a hub of a child conveyance device, the wheel locking assembly comprising:

a hub including a retention feature; and a wheel assembly including a wheel, a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve, a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and at least one detent captured by the sleeve and the spindle, wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and wherein the through-hole is radially tapered such that the through-hole is narrower towards the outer surface of the sleeve than towards the inner surface of the sleeve.

13. A wheel locking axle assembly to secure a wheel to a hub of a child conveyance device, the wheel locking assembly comprising:

a hub including a retention feature; and a wheel assembly including a wheel, a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve, a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and at least one detent captured by the sleeve and the spindle, wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and wherein the spindle includes a ramped surface adjacent a flat surface of a recess defined in the outer surface of the spindle and located near the second end of the spindle, the ramped surface extending from a first ramp edge that is adjacent the flat surface to a second ramp edge that is adjacent to the outer surface of the spindle, the first ramp edge being radially inward of the second ramp edge, and the second ramp edge being longitudinally between the first ramp edge and the second end of the spindle.

14. A child conveyance device comprising:
a frame;
a seat coupled to the frame;
a plurality of hubs, each hub including a retention feature; and
a plurality of wheel assemblies, at least one of the wheel assemblies including
    a wheel configured to be releasably secured to one of the hubs,
    a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve,
    a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and
    at least one detent captured by the sleeve and the spindle,
    wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and
    wherein the wheel attachment assembly includes
        a plurality of external threads located at the first end of the sleeve,
        an internally threaded lock nut secured to the plurality of external threads, the lock nut being configured to engage a first surface of at least one bearing of the wheel,
        a snap ring groove defined in the outer surface of the sleeve, and
        a snap ring received in the snap ring groove, the snap ring being configured to engage a second surface of the at least one bearing such that the at least one bearing is held between the lock nut and the snap ring at a location along the length of the sleeve.

15. The child conveyance device of claim 5, further comprising
a button having an outer surface and an inner surface, and
a spring held in compression between the inner surface of the button and the lock nut,
wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

16. A child conveyance device comprising:
a frame;
a seat coupled to the frame;
a plurality of hubs, each hub including a retention feature;
a plurality of wheel assemblies, at least one of the wheel assemblies including
    a wheel configured to be releasably secured to one of the hubs,
    a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve,
    a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and
    at least one detent captured by the sleeve and the spindle;
a button having an outer surface and an inner surface; and
a spring held in compression between the inner surface of the button and a lock nut,
wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and
wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

17. The child conveyance device of claim 16, wherein the button is slidably secured to a body of the wheel by at least one screw, and for each screw, a washer is positioned between a surface of a head of the respective screw and a surface of the body of the wheel.

18. A child conveyance device comprising:
a frame;
a seat coupled to the frame;
a plurality of hubs, each hub including a retention feature;
a plurality of wheel assemblies, at least one of the wheel assemblies including
    a wheel configured to be releasably secured to one of the hubs,
    a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve, a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and at least one detent captured by the sleeve and the spindle;

a first spring held in compression between a first compression surface of the spindle and a second compression surface formed on the inner surface of the sleeve; and a second spring held in compression between the at least one detent and a third compression surface formed on the inner surface of the sleeve, wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub.

19. The child conveyance device of claim 18, further comprising a button having an outer surface and an inner surface, and a third spring held in compression between the inner surface of the button and a lock nut, wherein when a user applies a sufficient longitudinal force on the outer surface of the button, the inner surface of the button engages the first end of the spindle to translate the spindle from the first longitudinal position with respect to the sleeve to the second longitudinal position with respect to the sleeve.

20. The child conveyance device of claim 18, wherein the spindle further includes external threads formed on the first end of the spindle, and a cap having internal threads secured to the external threads formed on the first end of the spindle, wherein the first compression surface of the spindle is located on the cap.

21. The child conveyance device of claim 20, further comprising a slot defined in the second end of the spindle.

22. The child conveyance device of claim 18, further comprising a washer positioned between the second spring and the at least one detent.

23. The child conveyance device of claim 22, further comprising a pin extending radially inwardly from the inner surface of the sleeve, the pin having a pin surface that engages the washer to limit the expansion of the second spring.

24. The child conveyance device of claim 18, further comprising a retaining ring secured to the outer surface of the spindle, the retaining ring engaging the third compression surface of the sleeve to limit the expansion of the first spring.

25. A child conveyance device comprising:
a frame;
a seat coupled to the frame;
a plurality of hubs, each hub including a retention feature; and
a plurality of wheel assemblies, at least one of the wheel assemblies including
a wheel configured to be releasably secured to one of the hubs,
a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve,
a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and
at least one detent captured by the sleeve and the spindle,
wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and
wherein the through-hole is radially tapered such that the through-hole is narrower towards the outer surface of the sleeve than towards the inner surface of the sleeve.

26. A child conveyance device comprising:
a frame;
a seat coupled to the frame;
a plurality of hubs, each hub including a retention feature; and
a plurality of wheel assemblies, at least one of the wheel assemblies including
a wheel configured to be releasably secured to one of the hubs,
a sleeve coupled to the wheel, the sleeve including a first end, a second end, an outer surface, an inner surface defining a channel extending from the first end of the sleeve to the second end of the sleeve, a wheel attachment assembly located at the first end of the sleeve to secure the sleeve to the wheel, and a through-hole defined in the outer surface of the sleeve near the second end of the sleeve,
a spindle that extends within the channel of the sleeve, the spindle including an outer surface, a first end, and a second end, the spindle being axially slidable within the channel of the sleeve, with the first end of the spindle being positioned proximate the first end of the sleeve and the second end of the spindle being positioned proximate the second end of the sleeve, and
at least one detent captured by the sleeve and the spindle,
wherein the spindle is configured to move between a first longitudinal position with respect to the sleeve in which a portion of the at least one detent extends radially outwardly through the through-hole to lockingly engage the retention feature of the hub and a second longitudinal position with respect to the sleeve in which the least one detent does not extend radially outwardly through the through-hole and in which the at least one detent disengages the retention feature of the hub, and wherein the spindle includes a ramped surface adjacent a flat surface of a recess defined in the outer surface of the spindle and located near the second end of the spindle, the ramped surface extending from a first ramp edge that is adjacent the flat surface to a second ramp edge that is adjacent to the outer surface of the spindle, the first ramp edge being radially inward of the second ramp edge, and the second ramp edge being longitudinally between the first ramp edge and the second end of the spindle.

* * * * *